United States Patent [19]
Thomsen

[11] Patent Number: 6,002,865
[45] Date of Patent: Dec. 14, 1999

[54] LOCATION STRUCTURE FOR A MULTI-DIMENSIONAL SPREADSHEET

[76] Inventor: Erik C. Thomsen, 42 Graves Ave., Northampton, Mass. 01060

[21] Appl. No.: 08/425,854

[22] Filed: Apr. 20, 1995

Related U.S. Application Data

[63] Continuation of application No. 07/890,635, May 28, 1992, abandoned.

[51] Int. Cl.⁶ .................................................. G06F 17/30
[52] U.S. Cl. .................. 395/600; 364/918; 364/963.2; 364/974.1; 364/282.1; 364/DIG. 2
[58] Field of Search .................................. 395/600, 800

[56] References Cited

U.S. PATENT DOCUMENTS

| | | | |
|---|---|---|---|
| 3,740,723 | 6/1973 | Beausoleil | 340/172.5 |
| 3,800,289 | 3/1974 | Batcher | 340/172.5 |
| 3,828,323 | 8/1974 | Heitman | 340/172.5 |
| 4,244,024 | 1/1981 | Marzalek | 364/485 |
| 4,253,152 | 2/1981 | Holdaway | 364/485 |
| 4,318,184 | 3/1982 | Millett | 364/900 |
| 4,369,463 | 1/1983 | Anastassiou | 358/135 |
| 4,395,699 | 7/1983 | Sternberg | 382/41 |
| 4,463,380 | 7/1984 | Hooks, Jr. | 358/160 |
| 4,513,374 | 4/1985 | Hooks, Jr. | 364/200 |
| 4,550,431 | 10/1985 | Werth | 382/1 |
| 4,555,771 | 11/1985 | Hayashi | 364/900 |
| 4,677,571 | 6/1987 | Riseman | 364/519 |
| 4,730,259 | 3/1988 | Gallant | 364/513 |
| 4,739,477 | 4/1988 | Barker | 364/300 |
| 4,751,635 | 6/1988 | Kret | 364/200 |
| 4,811,199 | 3/1989 | Kuechler | 364/200 |
| 4,882,692 | 11/1989 | Saxton | 364/518 |
| 4,914,605 | 4/1990 | Loughmiller, Jr. | 364/518 |
| 4,939,670 | 7/1990 | Freiman | 364/519 |
| 4,953,080 | 8/1990 | Dysart | 364/200 |
| 4,983,958 | 1/1991 | Carrick | 340/799 |
| 4,996,663 | 2/1991 | Nemes | 364/900 |
| 5,014,235 | 5/1991 | Morton | 364/900 |
| 5,021,995 | 6/1991 | Quint | 364/900 |
| 5,055,998 | 10/1991 | Wright | 364/200 |
| 5,072,366 | 12/1991 | Simcoe | 395/200 |
| 5,079,698 | 1/1992 | Grenier | 364/413.13 |
| 5,093,782 | 3/1992 | Muraski | 395/600 |
| 5,093,907 | 3/1992 | Hwong et al. | 395/152 |
| 5,231,577 | 7/1993 | Koss | 364/419 |
| 5,247,611 | 9/1993 | Norden-Paul et al. | 395/161 |
| 5,253,361 | 10/1993 | Thurman et al. | 395/600 |
| 5,317,686 | 5/1994 | Salas et al. | 395/157 |

OTHER PUBLICATIONS

"Dadisp is a whiz at graphing data in unique spreadsheetlike cells" Infoworld, Apr. 20, 1992.

"HiSheet analyzes spreadsheet data on one screen" Infoworld, Apr. 27, 1993.

Kari Hassinen et al., "Structured Spreadsheet Calculation" IEEE 1988 Workshop on Languages for Automation, pp. 129–133.

*Primary Examiner*—Thomas G. Black
*Assistant Examiner*—Peter Y. Wang
*Attorney, Agent, or Firm*—Dougherty & Associates

[57] ABSTRACT

System and method for structuring and manipulating data that includes a mechanism for processing the data and a mechanism for storing the data. A data structure includes a location structure, a content structure, and a mechanism for mapping each location structure to some or all of the variables within the storing mechanism. The location structure has at least two locators and each of the locators is configurable to have at least one resolution. Each resolution has one or more uniquely identifiable positions, wherein the juxtaposition of one position selected from each of the locators defines a unique location within the location structure. A content structure is provided which is configurable to have variables, wherein each of the variables defines a data item. A mechanism is also provided for mapping each location within the location structure to some or all of the variables within the content structure. A method is disclosed for structuring an manipulating data. A computer implemented process for storing, structuring, manipulating and processing data is also disclosed.

19 Claims, 6 Drawing Sheets

|  | JAN_91 | FEB_91 | MAR_91 | APR_91 | MAY_91 | MAR_92 | JUN_92 | SEP_92 |
|---|---|---|---|---|---|---|---|---|
| New York | 48 | 11,517,483 $2,500,000 | 56 | | | | | |
| Albany | | 114,873 $750,000 | | | | | | |
| Buffalo | | 462,768 $500,000 | | | | | | |
| Montpelier | | | | | | | | |
| St. Albans | | | | | | | | |
| Rutland | | | | | | | | |
| Boston | | | | | | | | |
| Northampton | | | | | | | | |
| Cambridge | | | | | | | | |
| Charlotte | | | | | | | | |
| Columbia | | | | | | | | |

Population; Sales

Figure 5a

|  | all_of_time |
|---|---|
| all_of_space | 12,095,124 $3,750,000 350 |

Population; Sales; Stores

Figure 5b

LOCATION STRUCTURE FOR A MULTI-DIMENSIONAL SPREADSHEET

CROSS REFERENCE TO RELATED APPLICATIONS

This application is a continuation application under 37 CFR 1.62 of prior application Ser. No. 07/890,635, filed on May 28, 1992 now abandoned.

A portion of the disclosure of this patent document contains material which is subject to copyright protection. The copyright owner has no objection to the facsimile reproduction of the patent disclosure by anyone, as it appears in the Patent and Trademark Office patent files or records, but otherwise reserves all copyright rights whatsoever.

BACKGROUND OF THE INVENTION

1. Field of the Invention

The present invention relates to information processing and data organization, and more particularly, to a system and method for structuring and manipulating data. As applied to the invention described herein, the term "computer program" means a computer program related invention, not a computer program per se.

2. Description of Related Art

The proliferation of personal computers has been accompanied by a proliferation of computer programs for use on those computers. Historically, two main classes of programs available for use on personal computers are spreadsheet and database programs. A useful visual metaphor for understanding existing database and spreadsheet programs is that of a matrix having rows and columns. The intersection of a row and a column defines a cell. Cells may contain different types of information or data, such as numbers, text, or boolean values. In existing technology, each cell is capable of containing a single value, that is, the cell is uni-variate. A cell is typically associated with a defining formula which determines the value of the cell. The defining formula is a set of processor instructions which, when executed, cause a value to be assigned to the cell. In some existing implementations a cell may also have an accompanying textual note.

Spreadsheet programs are useful for structuring and manipulating numeric data. Lotus 1-2-3 is an example of a currently available spreadsheet program. Lotus 1-2-3 is a trademark of Lotus Development Corporation. Spreadsheet programs include mechanisms for performing a variety of mathematical operations on ranges of data (e.g., permitting rapid summation or averaging of rows and/or columns of numbers). Early spreadsheet programs organized data in a two-dimensional row and column fashion analogous to an accounting ledger sheet, hence the term "spreadsheet". Newer spreadsheet programs include mechanisms for linking more than one spreadsheet together to accomplish a certain multi-dimensional effect for organizing data, and for providing a relational database in which to store data and spreadsheet formulas. These improvements to existing spreadsheet technology attempt to increase the ability to restructure and view data.

Database programs are another class of computer programs for personal computers. They are also useful for structuring and manipulating numeric data, however, they are typically employed for organizing textural information as well. For example, a typical use is to organize the names, addresses, and telephone numbers of businesses and individuals into a database in order to permit easy access to and organization of that information. dBASE is an example of a currently available database program. dBASE is a trademark of Borland International, Inc.

In addition to spreadsheet and database programs, data structuring and manipulation systems available for use on personal computers have evolved to include knowledge-based artificial intelligence systems (including expert systems and neuron network based systems), statistical modelling systems, computer assisted software engineering (CASE) systems, and simulation modelling systems.

In general, known existing technologies are not well suited for information-intensive situations. As used herein, the term "information-intensive situation" means an information processing problem involving a large number of variables and a large number of data points for each variable. An example of an information intensive situation is the modelling of the financial flow over time for a retail corporation comprising hundreds of retail units each selling thousands of products.

One of the many difficulties with existing technologies is that they typically rely on a single value cell architecture which, as it turns out, significantly hampers the ability to easily restructure and view complex data sets. In order to achieve increased restructuring and viewing capabilities, existing technologies typically compensate by providing cumbersome mechanisms for manipulating linked single valued cells.

The present invention includes a unique mechanism for structuring and manipulating data which is particularly well suited for information-intensive situations. The present invention is marketed under the trademark FREETHINK and a commercial embodiment including the invention is COPYRIGHT © Power Thinking Tools, Inc. 1991, all rights reserved.

Applicant is aware of the following U.S. patents and articles generally related to information processing and data organization.

| Patent No. | Expires | Inventor | Title |
| --- | --- | --- | --- |
| 4,318,184 | 03-02-1999 | Millett | INFORMATION STORAGE AND RETRIEVAL SYSTEM AND METHOD |
| 4,555,771 | 11-26-2002 | Hayashi | DATA PROCESSING SYSTEM FOR DATA BASE MANAGEMENT OF MATRIX TYPE DATA |
| 4,730,259 | 03-08-2005 | Gallant | MATRIX CONTROLLED EXPERT SYSTEM PRODUCIBLE FROM EXAMPLES |
| 4,739,477 | 04-19-2005 | Barker | IMPLICIT CREATION OF A SUPERBLOCK DATA STRUCTURE |
| 4,751,635 | 06-14-2005 | Kret | DISTRIBUTED MANAGEMENT SUPPORT SYSTEM FOR SOFTWARE MANAGERS |
| 4,811,199 | 03-07-2006 | Kuechler | SYSTEM FOR STORING AND MANIPULATING INFORMATION IN AN INFORMATION BASE |
| 5,055,998 | 10-08-2008 | Wright | INTERMEDIATE SPREADSHEET STRUCTURE |
| 5,019,961 | 05-28-2008 | Addesso | COMPUTER APPARATUS AND METHOD FOR LOGICAL MODELLING |
| 5,021,976 | 06-04-2008 | Wexelblat | METHOD AND SYSTEM FOR GENERATING DYNAMIC, INTERACTIVE VISUAL REPRESENTATIONS OF INFORMATION STRUCTURES WITHIN A COMPUTER |

-continued

| Patent No. | Expires | Inventor | Title |
|---|---|---|---|
| | 04-20-92 | Infoworld | "Dadisp is a whiz at graphing data in unique spreadsheetlike cells" |
| | 04-27-92 | Infoworld | "HiSheet analyzes spreadsheet data on one screen" |

Millett et al. relates to a computerized system and method for the compact storage and rapid retrieval and manipulation of data that is classified and stored in the form of hierarchal information trees. Briefly, data is classified and arranged in a mutually exclusive manner using a hierarchal information tree. Paths in the information tree are encoded in a bit string representation. Information is said to be stored, retrieved, separated, compared and interrelated by analyzing the encoded information tree and displaying results via an appropriate input/output device.

Hayashi relates to a data processing system having a data base in which matrix type data is prepared for a common data base and a plurality of programs access the contents of the common data base. Hayashi is directed to a data processing system which employs a hierarchical structure to handle matrix type data. N-dimensional matrix type data is stored on the basis of one-dimensional address information.

Gallant relates to a general purpose matrix controlled expert system which includes a matrix of learning coefficients, an external interface and inference engine.

Barker et al. relates to integrated multiple data editors and, more particularly, to a superblock structure containing two or more diverse object sets positioned so that the object sets overlap one another, reside side-by-side, or extend above or below one another. A "superblock" is defined as any displayable area containing two or more object sets positioned so that the object sets overlap one another, reside side-by-side or extend above or below one another.

Kret relates to an apparatus for a distributed computer based management support system for providing information to software managers regarding large scale on-going software development efforts and a method for use therein.

Kuechler et al. relates to a system for storing and manipulating information in an information base which employs a "topological" mapping technique. A topological map comprises compact symbols corresponding to predefined ranges of values of an attribute in the information base. Such a map purportedly may be retrieved and processed to efficiently retrieve stored information elements, given any general unpreprogrammed query as input to the system, and to determine correlations among various attributes of the information elements.

Wright relates to structures used to transfer formatted information between data processing systems, and more particularly to structures used to transfer a spreadsheet from one spreadsheet processing system to another. Wright seeks to provide an intermediate spreadsheet structure which can represent spreadsheets of any dimensionality, and which can represent any expressions or formats defined for spreadsheets. Note that in column 21, lines 3 through 4, it is stated that "[c]ells are 0-dimensional: they are points of data." In the present invention, cells, or locations, are multivariate and, in that sense, multi-dimensional and therefore different from the cells envisioned in connection with the Wright invention.

Addesso relates to a computer based modelling system which includes tooling means responsive to an interface means for enabling a high level user of the system to create a modelling methodology by editing a database to define: (a) modelling objects in terms of certain primitives; (b) a mode of viewing the modelling objects; and (c) logical relationships between elements of said modelling objects and views thereof.

Wexelblat relates to a computer system for inspecting and modifying data contained within an information system. A key aspect of the invention is an "automatic icon" feature which is defined by associating certain graphical primitives with certain mathematical relationships so that as an embodiment of the relationships is moved through an information space, the appearance of the icon automatically changes as a result of the correlation between the mathematical relationships and the contents of the information space.

The article which appeared in the Apr. 20, 1992 issue of Infoworld includes a description of a software product entitled Dadisp 3.0 for Windows. In Dadisp you purportedly "use spreadsheet like formulas to manipulate your data and see the results in adjacent windows." The article indicates that you "can apply routine statistical options to your data, such as ranking, sorting, conditional computation, transposition, descriptive statistics, and linear regression."

The article which appeared in the Apr. 27, 1992 issue of Infoworld announced "HiSheet", a Microsoft Excel add-on program that is said to allow organization of spreadsheets into hierarchical sets and control stacks of spreadsheet data. The article indicates that by "scrolling vertically and horizontally, users can traverse sections or levels to gather information for several types of analysis." Changes to data are said to be automatically updated through the stacks either aggregately or proportionally.

The present invented method, apparatus, and article of manufacture differ from the related art in several ways. Although the present invention employs the matrix metaphor to a certain extent, it differs from known existing technology in that, among other things, each cell or location is capable of containing more than a single data item or information item. Thus, each cell is multivariate, that is, it may have multiple variables wherein each variable contains either constant or computed information such as numbers, text, boolean values or references to external data sources. Typically, more than one value per cell is displayed to the viewer of the data. The number of viewable values per cell and the order of the values may be varied depending upon the preference of the viewer. Another important aspect of the present invention is that each cell exists in the context of a location which is defined by two or more locators. In the present invention, each of these locators may take on differing levels of aggregations. Each level of aggregation may be flexibly ordered on the basis of specified characteristics pertaining to the values. Flexible presentation of information is facilitated by distinguishing between data storage (the manner in which data is physically stored) and data representation (the manner in which data is displayed to a user or used by the system).

SUMMARY OF THE INVENTION

A system, or apparatus, for structuring and manipulating data includes a mechanism for processing the data and a mechanism for storing the data. A data structure includes a location structure, a content structure, and a mechanism for mapping each location within the location structure to all or some of the variables within the content structure. The location structure is representable within the storing mechanism. The location structure has at least two locators and each of the locators is configurable to have at least one resolution. Each resolution has one or more uniquely identifiable positions, wherein the juxtaposition of one position selected from each of the locators defines a unique location within the location structure. The content structure is configurable to have variables, wherein each of the variables defines a data item. A mechanism is provided for instantiating all or some of the variables with a value which represents the defined data item. A mechanism is also provided for mapping each location within the location structure to all or some of the variables within the content structure. Mechanisms for navigating within the location and content structures and for viewing the data are also provided. A method for structuring and manipulating data includes creating location and content structures for data, creating mappings between the location and content structures, and navigating and viewing the mapped structures. A computer implemented process which contains encoded instructions for performing the invented method is also disclosed.

The FreeThink 0.92 Manual and Tutorial ("Manual"), Revision Date: Jan. 5, 1992, contains a description of a number of features associated with the present technology, together with additional information about the system. These features include, but are not limited to, a data query facility, a macro language, sorting and manipulation features, and a data visualization feature. The Manual is specifically incorporated herein by reference.

In general, the invention serves as the basis for providing a familiar spreadsheet like interface; the ability to place multiple pieces of information within a single cell; a wide variety of information data types (including numbers, text paragraphs, links to remote files and databases); the ability to define formulas on classes of data separately from the data itself; the ability to define the appearance and handling of classes of data separately from the data itself regardless of how that data is currently being viewed; the ability to easily change the contents being shown, the resolution of the contents of the matrix axes, the transposition of the matrix axes, the ordering of contents within a cell; support for multi-dimensional data aggregations (collapsing and expanding data by adjusting the resolutions of the axes); and the ability to re-order the sequencing of the axes based on sort criteria applied to the contents of the cells.

The invention includes a data structuring and analysis tool which provides for a coordinate frame which links multiple levels of scale for the coordinate data types to allow zooming in or out to greater or lower levels of detail and for multiple types of data to exist for each coordinate within the coordinate frame. The levels of scale for each coordinate axis are independent of the levels of scale for each other coordinate axis, and zooming in or out on detail may be done independently per coordinate axis, or in tandem with one or more other axes. Data may be input at any logical level of scale or scale combination and may be aggregated or disaggregated to any other level of scale or scale-combination. Data at any coordinate may be combined with other data at the same or another level of scale or scale-combination. Data may include binary values, numbers, text, and data obtainable from external data sources.

OBJECTS OF THE INVENTION

The principal object of the invention is to provide a system and method for structuring and manipulating data.

A further object of this invention is to provide a system for data analysis in the areas of business, economics, science, infrastructure, the environment, and policy making.

A further object of this invention is to provide a system for computer-based problem-solving for information intensive situations.

Another object of this invention is to provide a system for structuring data in a multi-variate form.

A further object of this invention is to provide a system for structuring data which simultaneously maintains multiple levels of data aggregation in both spatial and temporal contexts.

Another object of this invention is to provide a system which can reorganize a large number of variables in a very brief period of time.

A further object of this invention is to provide a system which enables a user to view the data by zooming into or out of varying levels of data detail.

Another object of this invention is to provide a system which includes data query, macro language, ordering, and data visualization features.

A further object of this invention is to provide a system which enables easy navigation across, or selection from, a very large number of variables which can be viewed alone or in groups of any selected size.

Another object of this invention is to provide a computer program product directed to structuring and manipulating data which may be employed in lieu of dedicated computer hardware components.

BRIEF DESCRIPTION OF THE DRAWINGS

The foregoing and other objects will become more readily apparent by referring to the following detailed description and the appended drawings in which:

FIG. 5a is an illustration of an example output screen showing the months/cities resolution combination of the example shown in FIG. 4.

FIG. 5b is an illustration of an example output screen showing the all_of_time/all_of_space resolution combination of the example shown in FIG. 4.

DETAILED DESCRIPTION

Figure 1:
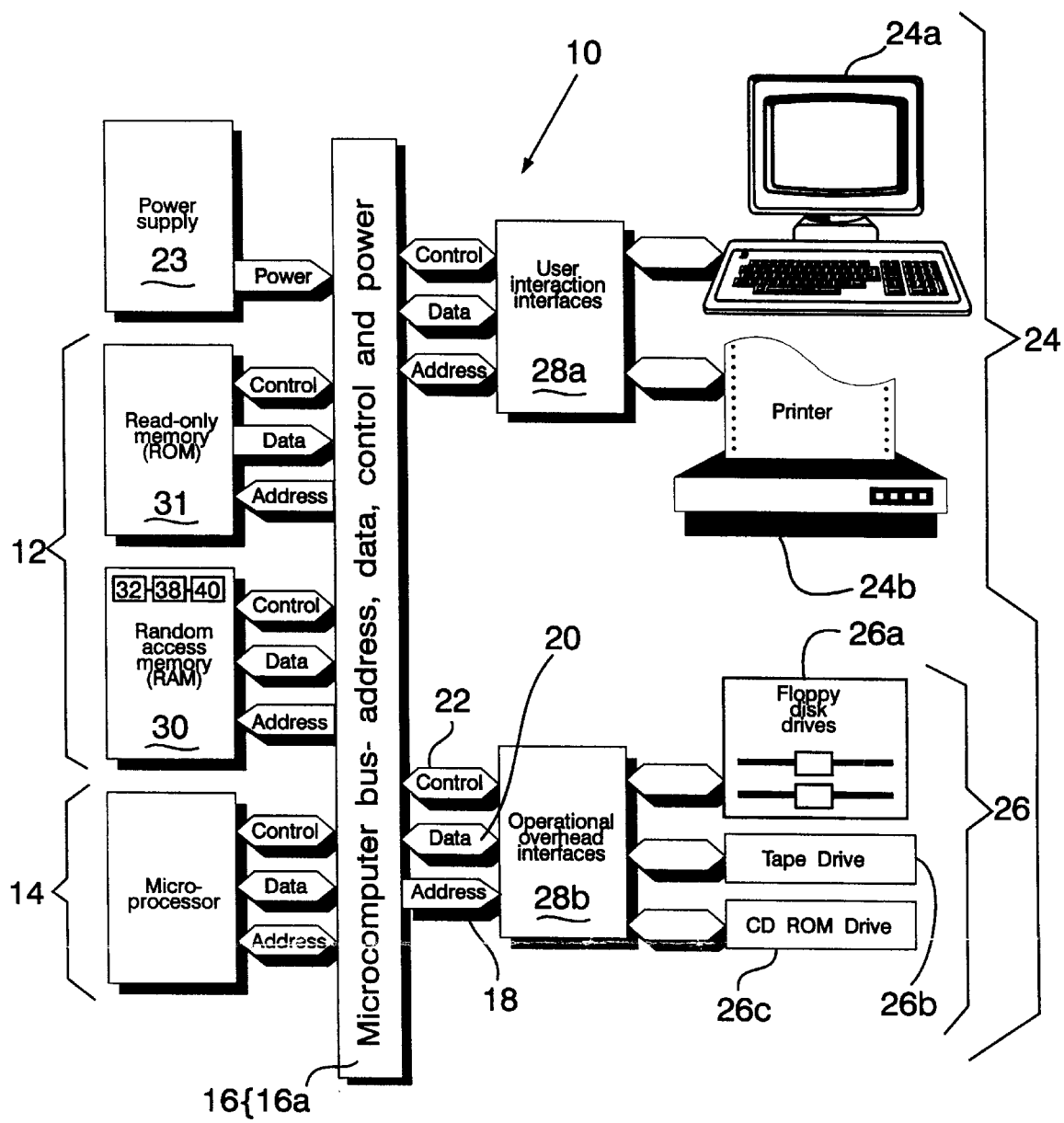
FIG. 1 is a flow diagram of a preferred embodiment of the invented apparatus for structuring and manipulating data, wherein the apparatus includes a microprocessor-based personal computer system.

Referring now to the drawings, and particularly to FIG. 1, there is shown a preferred embodiment of the invented system, or apparatus, 10 for structuring and manipulating data. The apparatus 10 includes means 12 for storing data, hereafter "storage", and means 14 for processing data, hereafter "processor". Data may take the form of processing instructions to the processor 14 or non-instructional data. As used herein, the term "apparatus" means an electric or electronic device (e.g., a computer) for governing in some programmable and predetermined way the power delivered to one or more ancillary devices.

Means 16 for communicating information between the processor 14 and the storage 12, such as a microcomputer bus 16*a*, is provided. The bus 16*a* enables address, data, and control signals to be communicated between the various components of the apparatus 10 over corresponding address 18, data 20, and control 22 lines. A power supply 23 coupled to the bus 16*a* supplies power to the apparatus 10.

Means 24 for input and output (I/O) is also provided. I/O means 24 includes various peripheral devices, such as display devices 24*a*, printers 24*b*, and secondary storage access means 26, which interact with other apparatus components through user interaction interface means 28*a* and operational overhead interface means 28*b* which connect to the bus 16*a*.

Storage 12 includes primary storage, such as random access memory (RAM) 30 and/or read only memory (ROM) 31. Storage 12 may also include secondary storage, such as disk, tape, or CD-ROM based storage media and means 26 for accessing same, such as a disk 26*a*, tape 26*b*, or CD-ROM 26*c* drives, respectively.

The processor 14 includes a primary microprocessor, such as an Intel 80386 microprocessor, and may also include a co-processor, such as an Intel 82786 microprocessor, both manufactured by Intel Corporation of Santa Clara, Calif., or one or more custom built microprocessors. It is important to emphasize, however, that the invention pertains not only to personal computers or microprocessor based computers, but may be implemented on any device capable of simulating the functions of a Turing machine.

The processor 14 interacts with primary storage by requesting and receiving data input from primary storage. Data stored on secondary storage is typically transferred from secondary storage to primary storage in order for the processor 14 to manipulate data.

Figure 2:
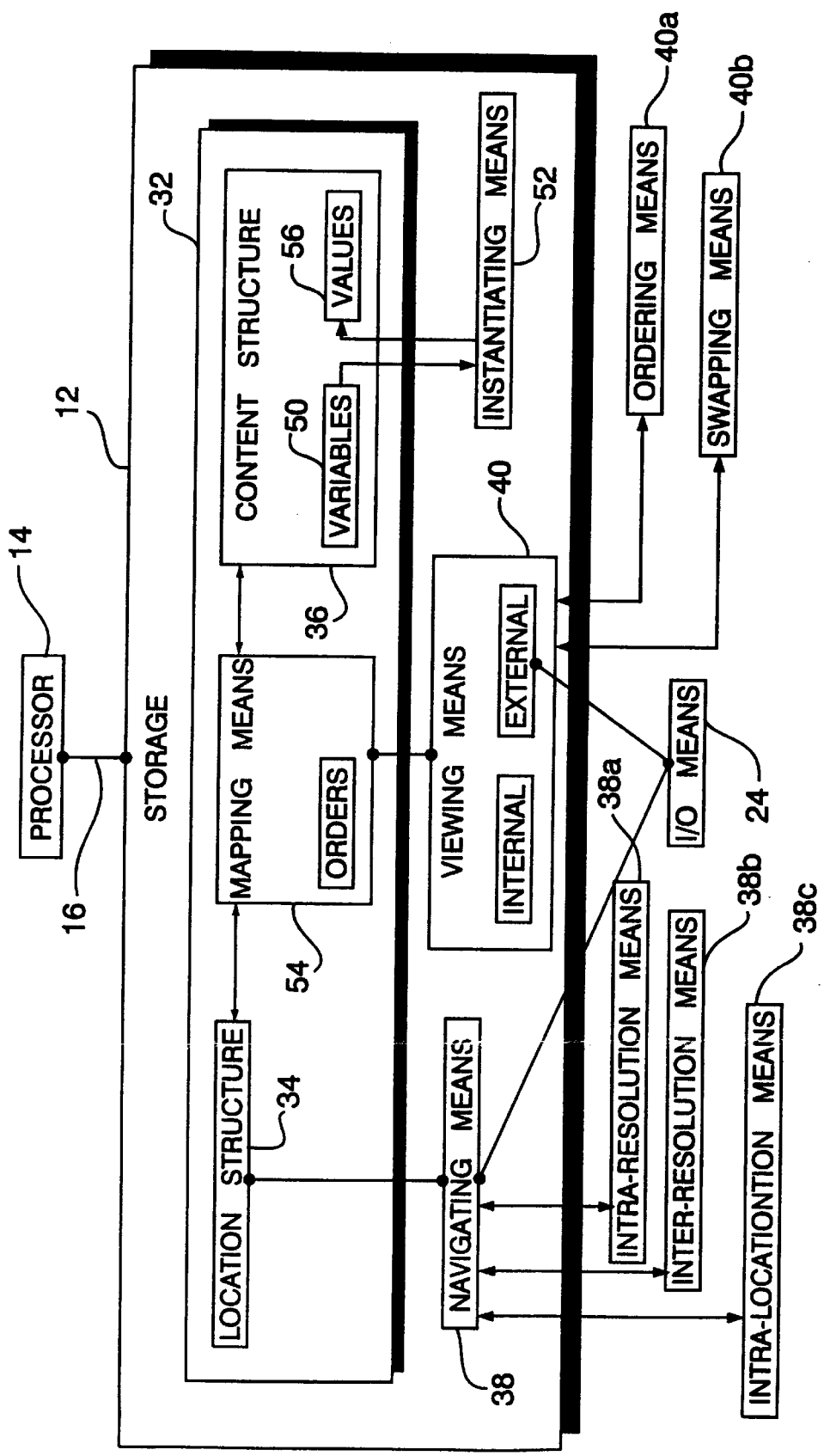
FIG. 2 is a block diagram of the invented system illustrating major components.

As shown in FIG. 2, data is structured in a data structure 32 which forms a particular data model defined by a location structure 34 and a content structure 36. The location structure 34 and the content structure 36 are related to one another in the manner described below. The apparatus 10 includes means 38 for navigating within the data structure and means 40 for viewing the data within the data structure.

Figure 3:
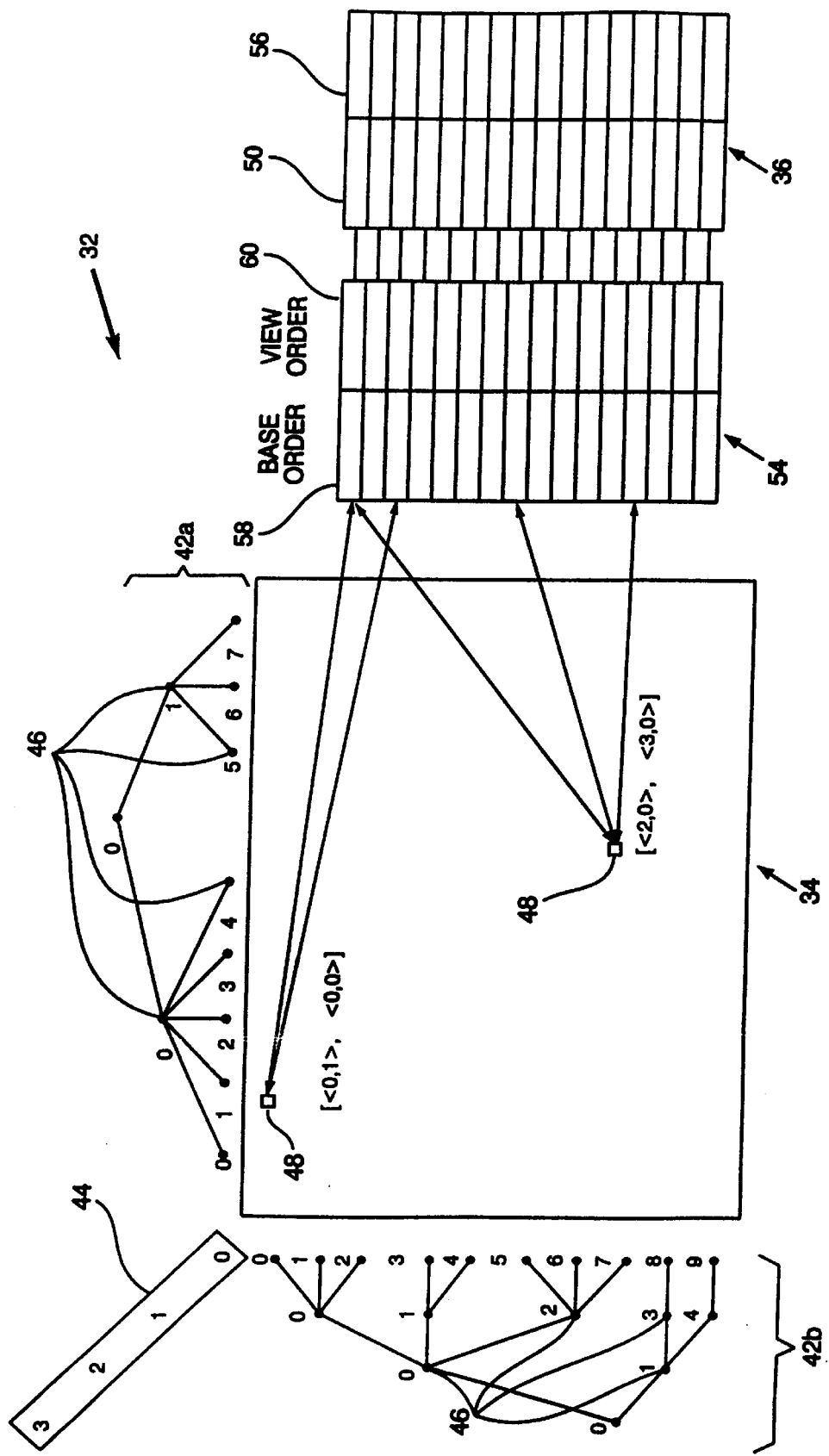
FIG. 3 is an illustration of the location structure, content structure, and mapping means components of the invention.

The components of the data structure 32 are shown in additional detail in FIG. 3. The location structure 34 for the data structure 32 has at least two locators 42. A locator 42 is a measurement in any one direction. In a two-locator data structure, for example, one locator (1st locator) may conveniently be treated as a time locator 42*a* and the other locator (2nd locator) may be treated as a space locator 42*b*. The time locator 42*a* may be structured as existing in a horizontal state and the space locator 42*b* as existing in a vertical state, or vice versa.

Figure 4:
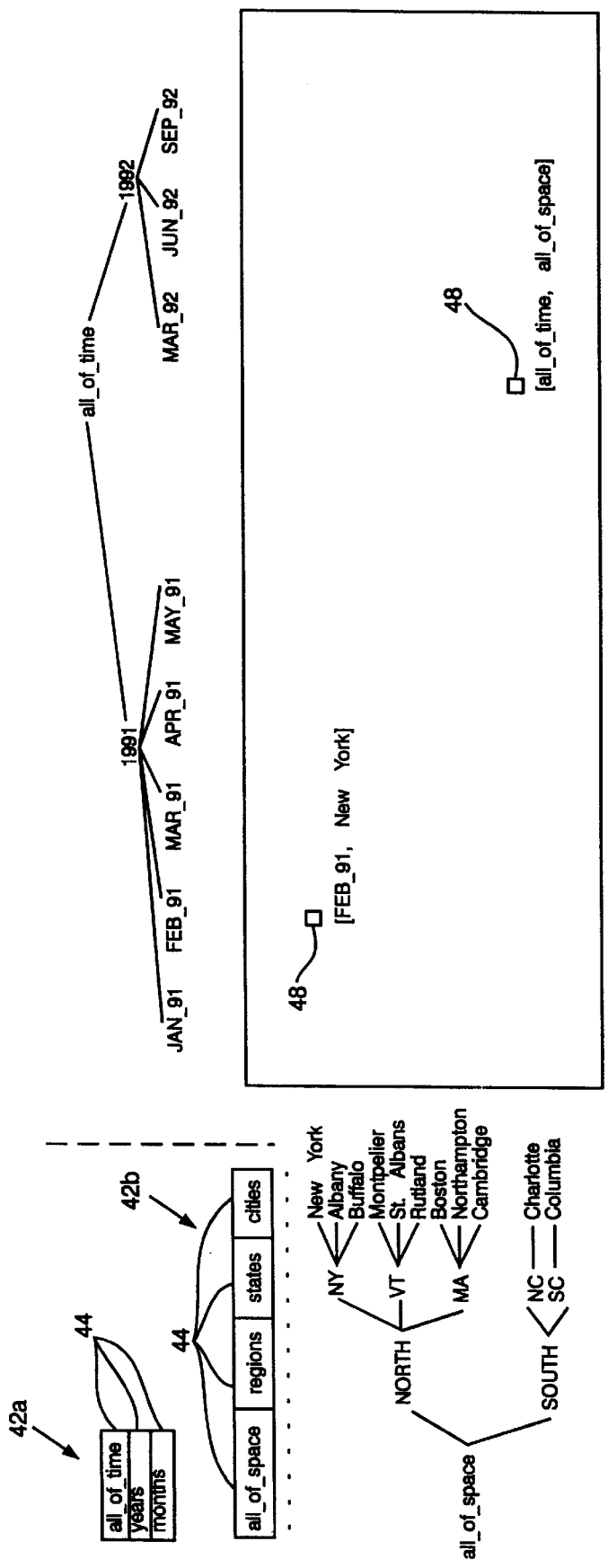
FIG. 4 is an illustration of an example data model.

Each locator 42 is configurable to have at least one resolution 44. As used herein, a resolution 44 is a reduction of locator information into one or more component parts. For example, a time locator 42*a* having a single resolution 44 may be configured to represent all of time, a series of years, a series of months, or a series of other time units. However, as illustrated in FIG. 4, a locator 42 may have more than one resolution 44. Resolutions 44 within a locator 42 are related to one another by increasing or decreasing levels of scale. Thus, to continue with the time locator 42*a* example of FIG. 4, a time locator 42*a* having three resolutions may be configured to represent (a) all of time (the lowest amount of resolution), (b) a series of years (a higher amount of resolution than all of time), and (c) a series of months (a higher amount of resolution than years and all of time). Each component part within a resolution 44 is referred to as a position 46. Resolution (a) would have a single position since the "all of time" resolution has only a single component, resolution (b) would have positions corresponding to each year in the series, and resolution (c) would have positions corresponding to each month in the series.

In general, resolutions 44 within a locator 42 are related to one another by connecting a position 46 within a lower resolution with one or more positions within a higher resolution. The "all of time" position in resolution (a), for example, may be connected to the year positions 1991 and 1992 in resolution (b). The year position 1991 in resolution (b) may in turn be connected to the month positions JAN-91, FEB-91, MAR-91, APR-91, and MAY-91, and the year position 1992 may be connected to the month positions MAR-92, JUN-92, and SEP-92. Notice that the MAR-91 and MAR-92 positions are distinct positions notwithstanding that they share the same month name (i.e., "March").

A space locator 42*b* may be defined in similar fashion to the time locator 42*a*. As depicted in FIG. 4, an example space locator 42*b* is shown having four resolutions: "all of space", regions, states, and cities. The two positions in the regions resolution are North and South. The five positions in the states resolution are NY, VT, MA, NC, and SC. The eleven positions in the cities resolution are New York, Albany, Buffalo, Montpelier, St. Albans, Rutland, Boston, Northampton, Cambridge, Charlotte, and Columbia. Positions 46 within different resolutions 44 have been appropriately connected in accordance with the geographic relationships between all of space, regions, states, and cities. Such positions may be connected in a variety of well known internal representational forms, such as a relational database table or a linked-list tree representation.

The juxtaposition of one position 46 selected from each of the locators 42 defines a unique location 48 within the location structure 34. FIG. 3 depicts two locations 48 within a location structure 34. One location 48 is at [<0,1>, <0,0>], which corresponds to a position 46 in the time locator 42*a* of FEB-91, and a position 46 in the space locator 42*b* of North region, NY state, New York city. The other location 48 is at [<2,0>, <3,0>], which corresponds to a juxtaposition of the "all of time" and "all of space" positions 46.

Notice that the two example locations 48 reside at different levels within the location structure 34. The location 48 specified by [<0,1>, <0,0>] resides at the highest resolutions 44 for both the time and space locators 42*a*, 42*b*, whereas the location 48 specified by [<2,0>, <3,0>] resides at the lowest resolutions 44 for both the space and time locators 42*a*, 42*b*. In general, the total number of locations 48 at a juxtaposition of resolutions 44 is equal to the multiplicative product of the number of positions 46 for each resolution 44. At the juxtaposition of the months and cities resolutions 44, within the space and time locators 42*a*, 42*b*, respectively, the total number of locations 48 is equal to the number of positions 46 in the cities resolution, (11) times the number of positions 46 in the months resolution (8), namely, eighty-eight (88). The total number of locations 48 in a location structure 34 is equal to the additive sum of the number of locations 48 at each possible combination of resolutions 44. In the example shown in FIG. 4, since there are four (4) space locator resolutions 44 and three (3) time locator resolutions 44, there are a total of twelve (12) possible resolution combinations. By summing the number of locations 48 at each resolution combination, the total number of locations 48 in the example location structure 34 is found to be two hundred nine (209).

In addition to a location structure 34, a data structure 32 also has a content structure 36. The content structure 36 is configurable to have a set of variables 50. Each of the variables 50 defines a data item. The term "data item" includes, but is not limited to, a quantity, a string, a file, an external data source, or an object (as such term is used in the context of object oriented programming). The apparatus 10 includes means 52 for instantiating each of the variables with a value which represents the defined data item. In general, variables 50 may be instantiated with values 56 either directly or indirectly. Variables 50 are directly instantiated with values 56 upon navigation of a user to a particular location 48 and the input of a fixed value 56, such as a number, text, or boolean value, into a particular variable 50 at that location 48. Variables 50 are indirectly instantiated with values 56 upon defining a set of variable-associated processor instructions which upon execution by the processor 14 result in the storing of a value 56 into a particular variable 50 at a particular location 48. In order to aggregate information, for example, a set of processor instructions associated with a variable located at the [all_of_time, all_of_space] location may compute the total of the values for that variable at all lower resolution levels.

There is provided means 54 for mapping each location 48 within the location structure 34 to all or some of the variables within the content structure 36. Mapping means 54 provides a mechanism for linking each location 48 with one or more variables 50 which define data items which are represented by values 56. A location 48 may be empty, in the sense that there are no variables 50 (and hence no values 56) associated with that location 48, or the location 48 may be associated with one or more variables 50 (and hence one or more values 56). Different locations 48 may be associated with the same variables 50. As in the case of the connection of positions 46 between resolutions 44, locations 48 and variables 50 may be mapped in a variety of well known internal representational forms, such as a relational database table or a linked-list tree representation. Classic representational forms and sorting and searching techniques are discussed in the well known three-volume treatise *The Art of Computer Programming,* by Donald E. Knuth (1973), ("Knuth") which is specifically incorporated herein. Background information relating to indexing and data models may also be found in the two-volume treatise *An Introduction to Database Systems,* by C. J. Date (vol. 1, 1973; vol. 2, 1983), which is specifically incorporated herein.

A key component of the apparatus 10 is means 38 for navigating within the location structure from one location to any other location. As previously discussed, locations 48 reside within resolution combinations, that is, the juxtaposition of a resolution 44 selected from each locator 42. A resolution combination may be thought of as a level or plane containing one or more locations 48. Navigating means 38 includes means 38a for moving from one position in a resolution to another position in the same resolution (intra-resolution navigation), and means 38b for moving from one position in a resolution to another position in a different resolution (inter-resolution navigation). The combination of intra-resolution and inter-resolution navigation facilitates movement within the location structure 34 from one location 48 to any other location 48. Navigation means 38 also includes means 38c for moving from one value 56 within a particular location 48 to another value 56 within the same location 48 (intra-location navigation).

A location 48 is uniquely identifiable by specifying its locator(s) 42, its resolution 44 for each locator 42, and its position 46 for each resolution 44. The convention used in FIG. 3 is to represent a location 48 as an n-tuple of ordered pairs, where n is the number of locators 42. Each ordered pair consists of a resolution 44 number and a position 46 number for a locator 42. Thus, [<0,1>, <0,0>] specifies a location within a two-locator location structure, wherein the location 48 is the juxtaposition of the 1st position in the 0th resolution of the 1st locator with the 0th position in the 0th resolution of the 2nd locator.

The representation of a location 48 in a numeric n-tuple form facilitates navigation in a relatively straightforward manner. A movement from one position 46 in a resolution 44 to another position 46 in the same resolution 44 is represented by incrementing or decrementing the position number in a particular ordered pair (i.e., positional movement). Similarly, a movement from one position 46 in a resolution 44 to the same position 46 in a different resolution 44 is represented by incrementing or decrementing the resolution number in a particular ordered pair (i.e., resolutional movement). Preferably, with respect to either positional or resolutional movement, an increment or decrement operation which would result in going beyond the range of permissible values (e.g., decrement 0) is handled by substituting the highest permitted value in the case of an unpermitted decrement operation, or the lowest permitted value in the case of an unpermitted increment operation. This is commonly referred to as a "wrap around". Also, in the event of a resolutional movement from a position 46 which has multiple lower level positions associated with it (e.g., the North region in the example), a mechanism is provided in which the invention may be configured to move to the top (NY), bottom (MA), middle (VT), or some other preselected relative position 46 within the relevant resolution 44.

The numeric n-tuple representation of a location 48 is a useful internal mechanism for representing a location 48. However, such a representation is cumbersome and difficult to understand. It is preferable to include means for labelling each position within a resolution with a unique identifier or name. In the example, the numeric representation [<0,1>, <0,0>] becomes [FEB_91, New York]. Labelling means such as table lookup mechanisms are well known in the art and will not be discussed further.

In the preferred embodiment, navigating means 38 is coupled to input-output means 24 in order to facilitate intra-resolution 38a and inter-resolution 38b navigation. One implementation is to associate the input from a computer keyboard or mouse device with movement from one position 46 in a resolution 44 to another position 46 in the same or different resolution 44. A partial set of associations which have the added benefit of being relatively intuitive are presented in the table below.

| Keystroke | Effect on Numeric n-tuple representation |
| --- | --- |
| up-arrow | decrement 2nd locator's position number |
| down-arrow | increment 2nd locator's position number |
| left-arrow | decrement 1st locator's position number |
| right-arrow | increment 1st locator's position number |
| ctrl + page-up | increment 1st locator's resolution number |
| ctrl + page-down | decrement 1st locator's resolution number |
| ctrl + left-arrow | increment 2nd locator's resolution number |
| ctrl + right-arrow | decrement 2nd locator's resolution number |
| page-up | increment resolution number for all locators |
| page-down | decrement resolution number for all locators |

The keystroke combinations listed above are intended only to illustrate a possible set of associations which may be employed in connection with navigating means 38. Another mechanism is to employ a mouse device to signal positional changes. Intra-resolution 38a navigation would then be accomplished by employing the mouse to "point" to the desired position 46 and by clicking a mouse device button in order to signal movement to the desired location 48. Those skilled in the art will recognize that on-screen "buttons" may be used in conjunction with the mouse in order to navigate between resolutions 44. Other suitable input-output means 24 include, but are not limited to, touch screen displays and pen-based computer systems.

Another key component of the apparatus is means 40 for viewing the data. The preferred viewing means 40 includes a display device 24a on which a portion of the data model may be displayed. As shown in FIG. 5a, each position 46 in the months resolution of the time locator 42a is displayed horizontally across the top of the display device 24a screen. Each position 46 in the cities resolution of the space locator 42b is displayed vertically along the left side of the display device 24a screen. Typically, and as depicted in FIG. 5a, more than one value 56 per location 48 is displayed to the viewer of the data. The number of viewable values 56 per location 48 may be varied using existing "window" resizing means (not shown), depending upon the desire of the viewer. Thus, assuming that the location specified by [FEB_91, New York] had been mapped to several hundred variables rather than the two variables shown in FIG. 5a, resizing means might be employed to increase the number of viewable values 56 per location 48 in order to permit more values to be viewed simultaneously on the screen.

I/O means 24, navigating means 38, and viewing means 40 are connected so that navigation within the data structure 32 results in a corresponding change in the information being viewed on the display device 24a screen. For example, using the keystroke navigation convention previously discussed, the keystroke sequence—page-up, page-up, ctrl+left-arrow—might result in the information depicted in FIG. 5b being displayed. In this case, navigation has resulted in displaying the [all_of_time, all_of_space] location. The depicted location has been mapped to three variables: Population; Sales; and Stores. It is assumed in the example that the "Population" variable has been defined to compute a value based on the summation of the Population values which exist at the months/cities resolution combination. The "Sales" variable is likewise assumed to have been defined to sum the Sales values at the months/cities resolution combination. For purposes of the example, the variable "Stores" is assumed to have been defined to be a value entered by the user of the system.

Mapping means 54 includes an index which associates locations 48 with variables 50 and variables 50 with values 56. The base order 58 is the order in which positions 46 and values 56 are initially stored in storage 12. The ordering of positions 46 and variables 50 as depicted by viewing means 40 is initially determined by the base order 58, but may be freely reconfigured into a viewer defined view order 60. A view order 60 is a mapping which associates positions 46 with variables 50 independent of the manner in which the values 56 are initially stored in storage 12. Data independence, or immunity of the invention to change in storage structure and access strategy, is an important aspect of the invention.

Viewing means 40 includes means 40a for ordering positions 46 and variables 50 and means 40b for swapping locators 42. Ordering means 40a includes mechanisms for displaying (a) the values 56 which exist at a particular location 48 in any arbitrary order or in accordance with some ordering principle; and/or (b) the positions 46 which exist at a particular resolution 44 in any arbitrary order or in accordance with some ordering principle. The ordering techniques discussed in Knuth may be employed for this purpose. For example, ordering means 40a might be employed in the example data model shown in FIG. 5a to order the city resolution on the basis of an ascending sort of Population values. The net result would be to swap the Albany and Buffalo positions and associated locations.

Figure 6:
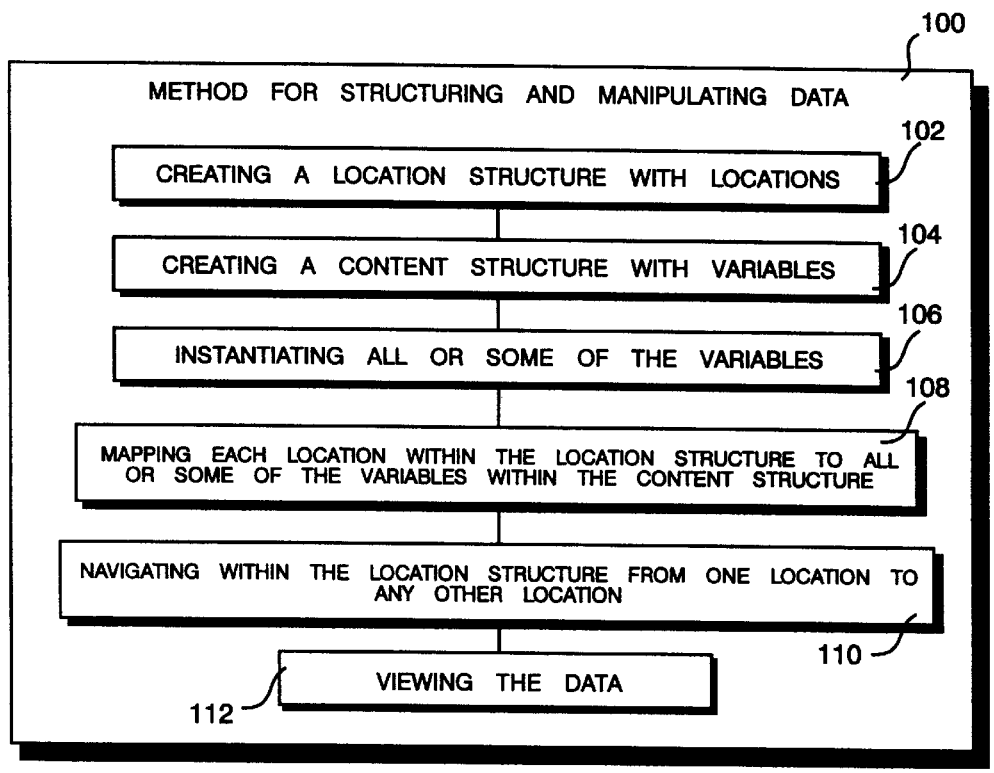
FIG. 6 is a flow diagram of the invented method for structuring and manipulating data.

As shown in FIG. 6, a method 100 for structuring and manipulating data includes creating location and content structures for data, steps 102, 104, instantiating all or some of the variables in the content structure with values, step 106, mapping between the location and content structures, step 108, and navigating and viewing the mapped structures, steps 110, 112. In general, the method 100 parallels the operational steps of the apparatus 10. A location structure 34 for structuring the data is created, step 102. The location structure 34 has a least two locators 42. Each of the locators 42 is configurable to have at least one resolution 44. Each resolution 44 of each locator 42 has one or more uniquely identifiable positions 46. The juxtaposition of one position 46 selected from each of the locators 42 defines a unique location 48 within the location structure 34. A content structure 32 is also created, step 104. The content structure 32 is configurable to have variables 50. Each of the variables 50 defines a data item. All or some of the variables 50 are, step 106, with a value 56 which represents the defined data item. Each location 48 within the location structure 34 is mapped, step 108, to all or some of the variables 50 within the content structure 32. The data structure 32, and hence the data model, may be navigated, step 110, and viewed, step 112, by moving from one location 48 in the location structure 34 to another. The method 100 may further include displaying (a) the values 56 which exist at a particular location 48 in any arbitrary order or in accordance with some ordering principle; and/or (b) the positions 46 which exist at a particular resolution 44 in any arbitrary order or in accordance with some ordering principle.

Figure 7:
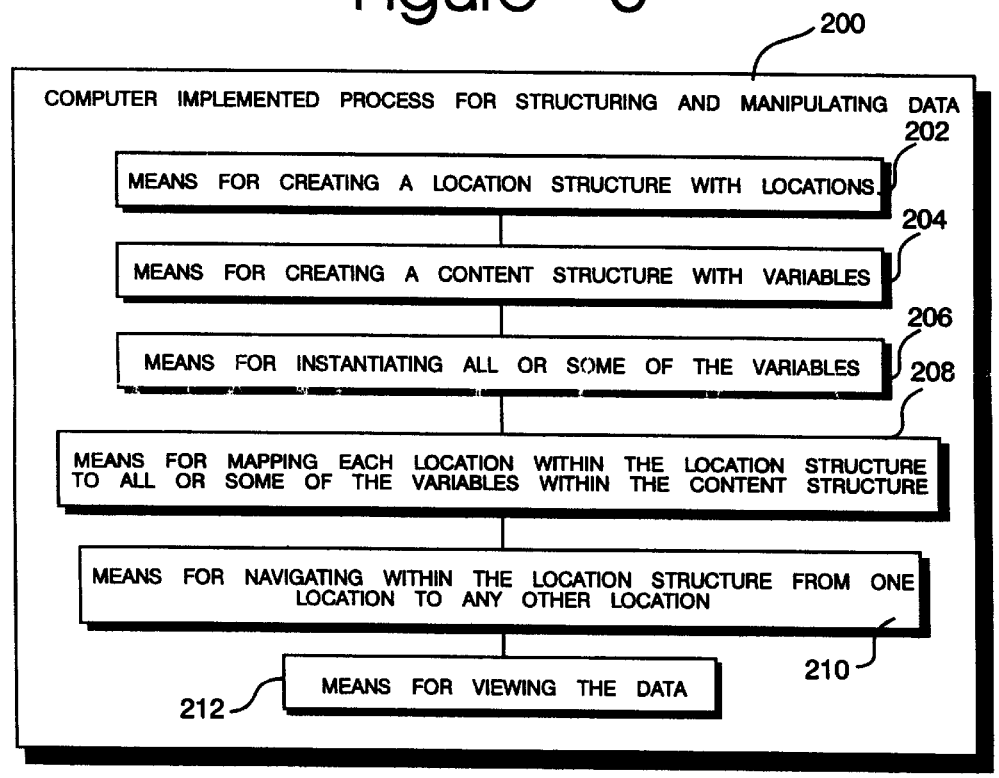
FIG. 7 is a block diagram illustrating the invented computer implemented process.

As shown in FIG. 7, the invention includes a computer implemented process 200 which contains encoded instructions for performing the invented method. The computer implemented process 200 has a computer readable medium which has computer program logic recorded thereon for structuring data. The computer program product 200 includes means 202 for creating a location structure which includes locations, means 204 for creating a content structure which includes variables, means 206 for instantiating all or some of the variables with values, means 208 for mapping each location within the location structure to all or some of the variables within the content structure, means 210 for navigating within the location structure from one location to any other location, and means 212 for viewing the data.

SUMMARY OF THE ACHIEVMENT OF THE OBJECTS OF THE INVENTION

From the foregoing, it is readily apparent that I have invented an improved system and method for structuring and manipulating data in a multi-variate form for computer-based problem-solving for information intensive situations, which simultaneously maintains multiple levels of data aggregation in both spatial and temporal contexts, enables a user to view the data by zooming into or out of varying levels of data detail, and can reorganize a large number of variables in a very brief period of time, in a more efficient and less expensive manner than heretofore available.

It is to be understood that the foregoing description and specific embodiments are merely illustrative of the best mode of the invention and the principles thereof, and that various modifications and additions may be made to the method and apparatus by those skilled in the art, without departing from the spirit and scope of this invention, which is therefore understood to be limited only by the scope of the appended claims.

Computer Program Listing

The source code computer program listing submitted with this specification is not believed to be required for meeting the enablement or best mode requirements. It is submitted for the purpose of supplementing disclosure of the invention. Until publicly disclosed, the listing is considered to contain trade secrets and confidential information. The right to delete the listing by amendment to the application prior to issuance of the patent is reserved.

What is claimed is:

1. A computer system for storing, structuring, manipulating and viewing data in the cells of a spreadsheet, the data selected from a plurality of locators, each locator having at least one resolution and each resolution of each locator having at least one position, said system comprising:

processor means for controlling the storage, retrieval, structuring, manipulating and viewing of the data;

storing means electrically coupled to said processor means for storing the data to addresses assigned to the data by said processor means, said storing means comprising data structuring means for structuring the data in a data structure wherein each resolution and position combination of each locator defines an ordered pair of an n-tuple location within the data structure that corresponds to a cell of the spreadsheet;

interface means electrically coupled to said processor means for manipulating the data in the data structure; and viewing means electrically coupled to said processor means for viewing the contents of the cells of the spreadsheet.

2. The computer system of claim 1 wherein at least one locator has a plurality of resolutions, the resolutions related to each other by increasing or decreasing levels of scale.

3. The computer system of claim 1 wherein the data structure of said storing means comprises:

a location structure comprising the n-tuple locations defined by the ordered pairs of resolution and position combinations of each locator;

a content structure operably coupled to said location structure and comprising variables which define data items; and mapping means operably coupled to said location structure and said content structure for mapping each location of said location structure to at least one of the variables of said content structure.

4. The computer system of claim 3 further comprising instantiating means for instantiating each of the mapped variables with a value that represents the data item defined by the variable.

5. The computer system of claim 4 wherein said mapping means comprises navigating means for navigating within said location structure and within said content structure.

6. The computer system of claim 5 wherein said navigating means comprises:

intra-resolution navigation means for moving from a first position in a resolution to a second position in the resolution;

inter-resolution navigation means for moving from a first position in a first resolution to a second position in a second resolution; and inter-location navigation means for moving from a first value in a cell to a second value in the cell.

7. The computer system of claim 3 wherein each data item is selected from the group consisting of a numeric quantity, text, an alphanumeric string, a file, an external data source and an object used in object oriented programming.

8. The computer system of claim 1 wherein the cells of the spreadsheet are multivariate.

9. The computer system of claim 1 wherein at least one of the locators is a time locator and at least one of the locators is a space locator.

10. The computer system of claim 1 further comprising a power supply electrically coupled to said processor means and wherein said processor means comprises a microcomputer bus for communicating address, data and control signals between said processor means and said storing means, said interface means and said viewing means.

11. A method of storing, structuring, manipulating and viewing data in the cells of a spreadsheet using a computer system comprising processor means, storing means, interface means and viewing means, the method comprising the steps of:

storing data input by the interface means to addresses in the storing means assigned by the processor means;

structuring the data in the storing means in a data structure including a location structure and a content structure, the location structure comprising a plurality of locators, each locator having at least one resolution and each resolution of each locator having at least one position, each resolution and position combination of each locator defining an ordered pair of an n-tuple location within the data structure that corresponds to a cell of a spreadsheet, the content structure comprising variables which define data items;

mapping each location of the location structure to at least one of the variables of the content structure; and viewing the mapped variables in the cells of the spreadsheet on the viewing means.

12. The method of claim 11 wherein at least one locator of the location structure has resolutions related to each other by increasing or decreasing levels of scale.

13. The method of claim 11 further comprising the step of instantiating each of the mapped variables with a value that represents the data item defined by the variable.

14. The method of claim 11 wherein the step of mapping comprises the further step of navigating within the location structure and within the content structure.

15. The method of claim 14 wherein the step of navigating comprises the further steps of:

moving from a first position in a resolution to a second position in the resolution;

moving from a first position in a first resolution to a second position in a second resolution; and moving from a first value in a cell of the spreadsheet to a second value in the cell.

16. The method of claim 11 wherein the steps of storing, structuring, mapping and viewing are controlled by the processor means.

17. A computer implemented process for storing, structuring, manipulating and viewing data in the cells of a spreadsheet using a computer system comprising processor means, storing means, interface means and viewing means, said process comprising the steps of:

controlling the storing, structuring, mapping and viewing of the data using the processor means to communicate between the storing means, the interface means, the viewing means and the processor means;

storing data input by the interface means to addresses in the storing means assigned by the processor means;

structuring the data in the storing means in a data structure including a location structure and a content structure, the location structure comprising a plurality of locators, each locator having at least one resolution and each resolution of each locator having at least one position, each resolution and position combination of each locator defining an ordered pair of an n-tuple location within the data structure that corresponds to a cell of a spreadsheet, the content structure comprising variables which define data items;

mapping each location of the location structure to at least one of the variables of the content structure;

instantiating each of the mapped variables with a value that represents the data item defined by the variable;

viewing the mapped variables in the cells of the spreadsheet on the viewing means.

18. The computer implemented process of claim 17 wherein at least one locator of the location structure has resolutions related to each other by increasing or decreasing levels of scale.

19. The computer implemented process of claim 17 wherein the step of mapping comprises the further steps of:

navigating within the location structure and within the content structure by moving from a first position in a resolution to a second position in the resolution;

moving from a first position in a first resolution to a second position in a second resolution; and moving from a first value in a cell of the spreadsheet to a second value in the cell.

* * * * *